(12) United States Patent
Braedt

(10) Patent No.: US 9,150,280 B2
(45) Date of Patent: Oct. 6, 2015

(54) BICYCLE MULTI-GEAR CASSETTE

(75) Inventor: Henrik Braedt, Würzburg (DE)

(73) Assignee: SRAM, LLC, Chicago, IL (US)

( * ) Notice: Subject to any disclaimer, the term of this patent is extended or adjusted under 35 U.S.C. 154(b) by 1073 days.

(21) Appl. No.: 11/689,466

(22) Filed: Mar. 21, 2007

(65) Prior Publication Data
US 2008/0231014 A1 Sep. 25, 2008

(51) Int. Cl.
B62M 9/10 (2006.01)

(52) U.S. Cl.
CPC ........................................ B62M 9/10 (2013.01)

(58) Field of Classification Search
USPC ............... 474/152–158, 164; 3/152–158, 164
See application file for complete search history.

(56) References Cited

U.S. PATENT DOCUMENTS

| | | | |
|---|---|---|---|
| 4,121,474 A | 10/1978 | Arregui Suinaga | |
| 4,353,447 A | 10/1982 | Bes | |
| 4,380,445 A * | 4/1983 | Shimano | 474/144 |
| 4,472,163 A | 9/1984 | Bottini | |
| 5,194,051 A | 3/1993 | Nagano | |
| 5,503,600 A | 4/1996 | Berecz | |
| 5,788,593 A * | 8/1998 | Tiong | 474/160 |
| 6,428,437 B1 * | 8/2002 | Schlanger | 474/160 |
| 2005/0090349 A1 * | 4/2005 | Lee | 474/160 |
| 2006/0063624 A1 | 3/2006 | Voss | |

FOREIGN PATENT DOCUMENTS

| | | |
|---|---|---|
| DE | 78 16 931 U1 | 11/1979 |
| DE | 10 2009 006101 | 7/2009 |
| EP | 0 834 450 | 4/1998 |

OTHER PUBLICATIONS

Photograph of a plastic cassette cut in half, Circa 1996.

* cited by examiner

*Primary Examiner* — Anna Momper
(74) *Attorney, Agent, or Firm* — Milan Milosevic; Lisa Serdynski

(57) ABSTRACT

A bicycle multi-gear cassette mountable to a wheel hub driver mechanism that includes truncated conical shell having a first opening proximate a small shell base and a second opening proximate a large shell base. The openings are coaxial with an axis of the shell. A plurality of toothed sprockets having different numbers of teeth are disposed on the shell and extend radially of the central axis. A torque load transmitting profile is configured on the shell proximate one of the small and large shell bases. A radial load transmitting profile is configured on the shell proximate one of the small and large shell bases. The shell, sprockets, and the load transmitting profiles embody a single piece.

6 Claims, 8 Drawing Sheets

BICYCLE MULTI-GEAR CASSETTE

BACKGROUND OF THE INVENTION

The present invention relates to bicycle multi-gear cassettes, and more particularly, to a multi-gear cassette that includes a truncated conical shell, a plurality of toothed sprockets disposed thereon, a torque load transmitting profile, and a radial load transmitting profile wherein the shell, sprockets and load transmitting profiles embody a single piece.

In a conventional multi-gear bicycle cassette, a plurality of discrete sprockets of variable diameter are arranged radially about an axis of a wheel hub. Each sprocket has a plurality of teeth spaced around its periphery for engaging a bicycle chain. The sprockets are mountable to the wheel hub to transfer pedaling forces from the bicycle chain to the wheel hub. In conventional designs, each sprocket may include a torque and radial load transmitting profile that mates to a corresponding profile on the wheel hub. One disadvantage of this design is that the sprockets are acting individually in transmitting pedaling load from the chain, at one end, to the wheel hub, at the other end, making the sprockets vulnerable to buckling and thus requiring thicker and heavier sprockets than desired.

In other devices, the individual sprockets may attached to a plurality of carrier arms of an intermediate carrier, the arms receiving loading from the sprockets and transmitting it to the wheel hub. Although the carrier may provide some lateral support to the sprockets, the carrier arms may themselves twist and flex under loading, also leading to buckling. Carriers with more rigid arms provide additional buckling resistance but come with a weight penalty. Beyond being resistant to buckling, carrier and noncarrier-based multi-gear cassettes must be sufficiently rigid to resist excessive twisting and flexing under high impact pedaling forces to provide positive and direct load transmission to the wheel hub.

In the carrier cassettes described above, the discrete sprockets are attached to the carrier arms using bolts, mating threads, coupling projections or the like. These mechanical connections not only require additional material on the mating pieces, making the sprocket assembly heavier, but also introduce hole and thread features that weaken the mating parts and provide possible fatigue and fracture failure points on both the sprockets and carrier. Finally, such mechanical connections also introduce additional unwanted flexibility as they twist and deform under loading, softening load transmission from the chain to the wheel hub.

Accordingly, a single-piece cassette according to the present invention avoids these design limitations by providing a rigid, buckling-resistant and lightweight load transmission path from the chain to the wheel hub driver mechanism. In the prior devices having discrete sprockets, with or without intermediate carriers, the user may selectively replace one or more of the individual sprockets to customize the gear ratios of the cassette. Additionally, in a cassette design with discrete sprockets, the complex recess and cutout features on the face of the sprockets, as well as the precise chamfered tooth features, may be more readily and economically produced by stamping these features onto individual sprockets before assembly into a cassette. The present invention achieves both a rigid and lightweight design that is contrary to the teachings of these prior devices. By using a single-piece truncated hollow cone design that ignores the art-perceived need for discrete sprockets, the present invention represents far more than a structural difference over these prior devices.

SUMMARY OF THE INVENTION

An object of the present invention is to provide a lightweight single-piece multi-gear cassette that rigidly transmits load from the bicycle chain to the wheel hub.

The present invention provides a bicycle multi-gear cassette that generally includes a truncated conical shell, a plurality of toothed sprockets of variable diameter, a torque load transmitting profile, and a radial load transmitting profile wherein the shell, sprockets and load transmitting profiles embody a single piece. The sprockets are disposed on the shell and extend radially of the shell axis. The shell has a first opening proximate a small shell base and a second opening proximate a large shell base. The first and second openings are coaxial with an axis of the shell. A torque load transmitting profile is configured on the shell at the small shell base, at the large shell base, or at an axially-interior location on the shell proximate the small or large bases, or any combination thereof. Likewise, a radial load transmitting profile is configured at the small shell base, at the large shall base, or at an axially-interior location on the shell proximate the small or large bases, or any combination thereof. The radial and torque load transmitting profiles are positioned on the shell to stably support the cassette when mounted on the wheel hub.

In one embodiment of the present invention, the shell may have a stepped configuration that includes a plurality of coaxial annular cylinders of variable diameter extending along the shell axis and a plurality of coaxial annular discs of variable diameter extending radially of the shell axis. The cylinders and discs are alternatingly arranged in a stepped sequence. A torque load transmitting profile is configured at or proximate an axially-outermost cylinder or disc or any combination thereof. Likewise, a radial load transmitting profile is configured at or proximate an axially-outermost cylinder or disc or any combination thereof. The cylinders, discs, sprockets and load transmitting profiles embody a single piece.

In another embodiment of the present invention, the shell may have a tapered configuration that includes a plurality of cone segments connecting the toothed sprockets. One or more of the cone segments are preferably oriented at an angle greater than 45 degrees from the shell axis. The cone segments, sprockets and load transmitting profiles embody a single piece.

In another embodiment of the present invention, the bicycle multi-gear cassette may include a cap member that is coupled to or proximate the large shell base and extends radially of the shell axis. The cap member includes a third opening coaxial with the shell axis for receiving a hub driver mechanism. The first opening proximate the small shell base is configured for receiving the hub driver mechanism. The torque load transmitting profile is configured at either the first or third openings, or both, for transmitting torque load to the hub driver mechanism. The radial load transmitting profile is configured at either the first or third openings, or both, for transmitting radial load to the hub driver mechanism.

These and other features and advantages of the present invention will be more fully understood from the following description of one or more embodiments of the invention, taken together with the accompanying drawings.

DETAILED DESCRIPTION

Figure 6:
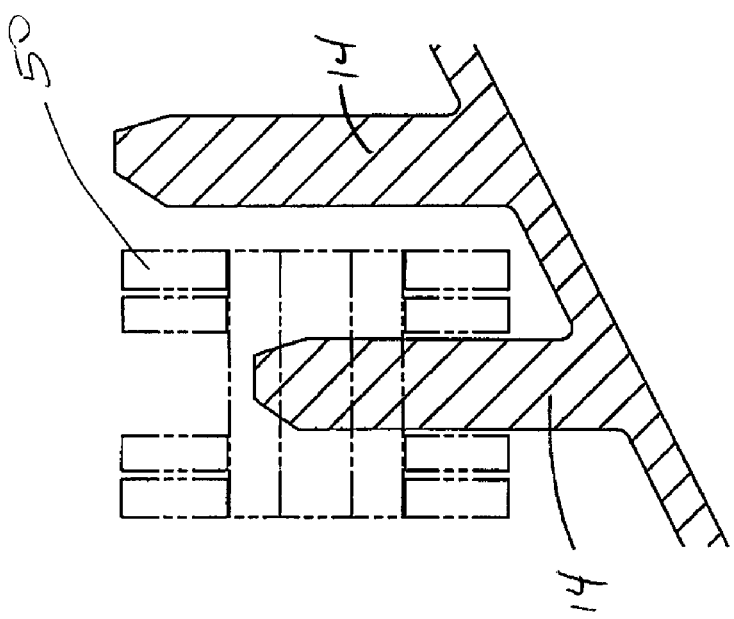
FIG. 6 is a detailed cross-sectional view of a bicycle chain engaging a sprocket tooth of the bicycle multi-gear cassette of FIG. 5.

FIGS. 1-4a and 7 illustrate a bicycle multi-gear or multi-sprocket cassette 10 according to one embodiment of the present invention. The sprocket cassette 10 generally includes a shell 12, a plurality of toothed sprockets 14, torque and radial load transmitting profiles 30, 38, 46, wherein the shell 12, toothed sprockets 14 and load transmitting profiles 30, 38, 46 embody a single piece. The single-piece construction may be achieved by any number of manufacturing processes, including for example, forming, casting, forging, or machining. The toothed sprockets 14 have different diameters and are disposed radially on the shell 12 relative to the shell axis 18. Each sprocket 14 includes a plurality of teeth 48 spaced around of the periphery of the sprocket 14 for engaging a bicycle chain 50 (FIGS. 6 and 7), each sprocket having a different number of teeth.

In the embodiment shown, the shell 12 has a stepped configuration; however the shell may assume any linear or non-linear shape that properly positions the toothed sprockets. In the stepped embodiment shown, the shell 12 includes a plurality of coaxial annular cylinders 16 of variable diameter extending along a shell axis 18 and a plurality of coaxial annular discs 20 of variable diameter extending radially of the shell axis. The cylinders 16 and the discs 20 are alternatingly arranged in a stepped sequence to form the conical shell 12.

Figure 1:
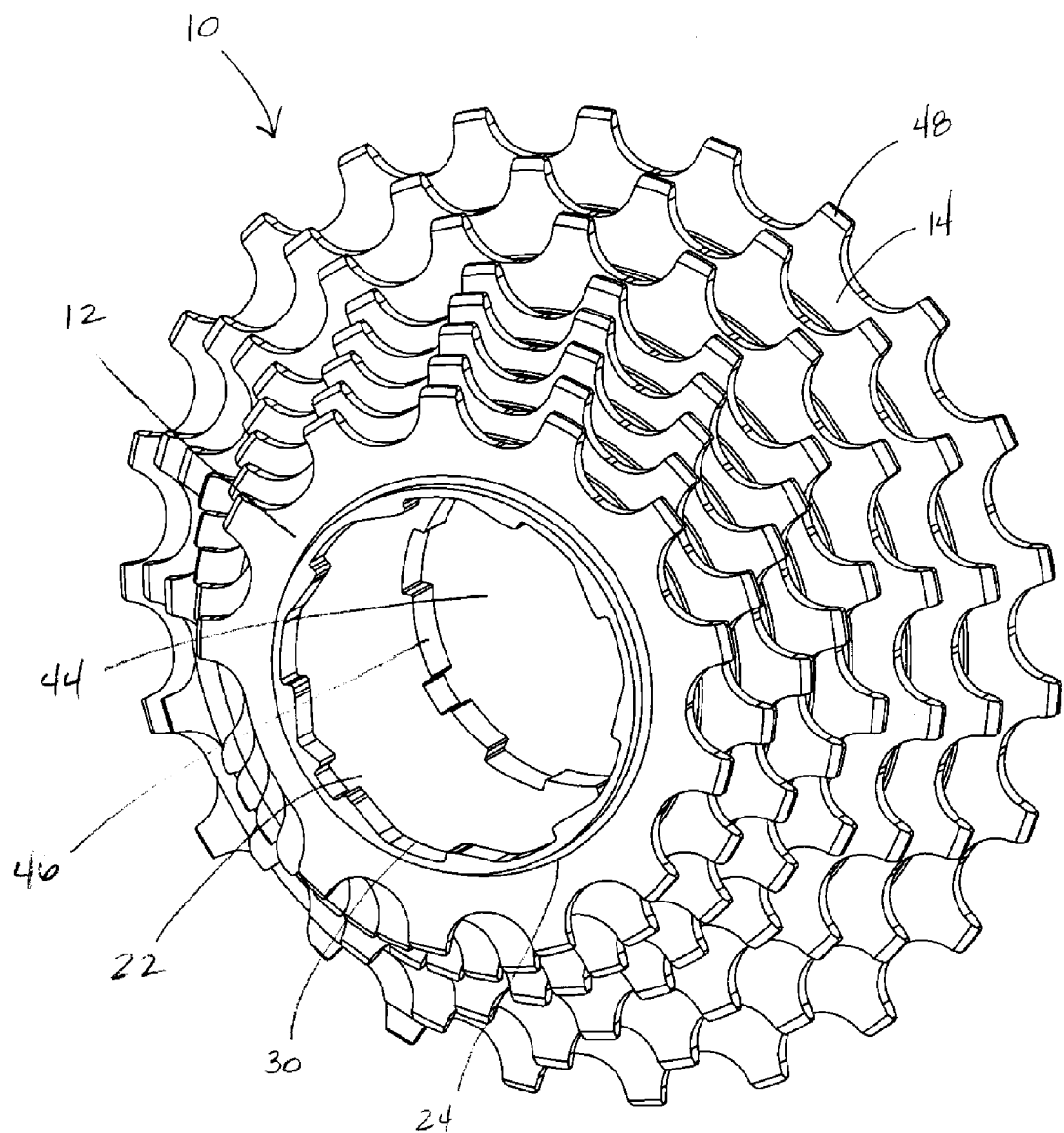
FIG. 1 is a front perspective view of a bicycle multi-gear cassette accordance to one embodiment of the present invention.
Figure 2:
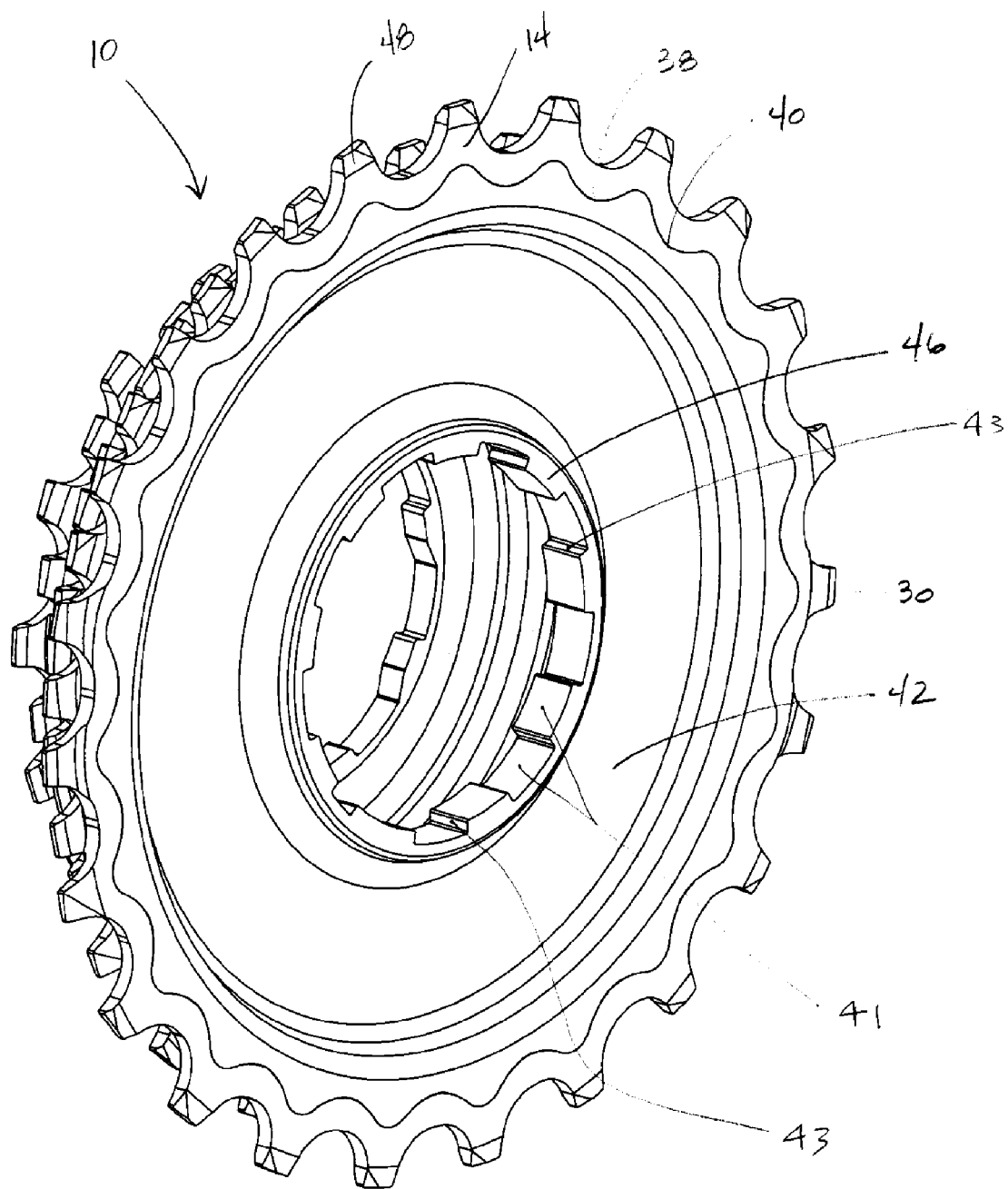
FIG. 2 is a rear perspective view of the bicycle multi-gear cassette of FIG. 1.
Figure 3:
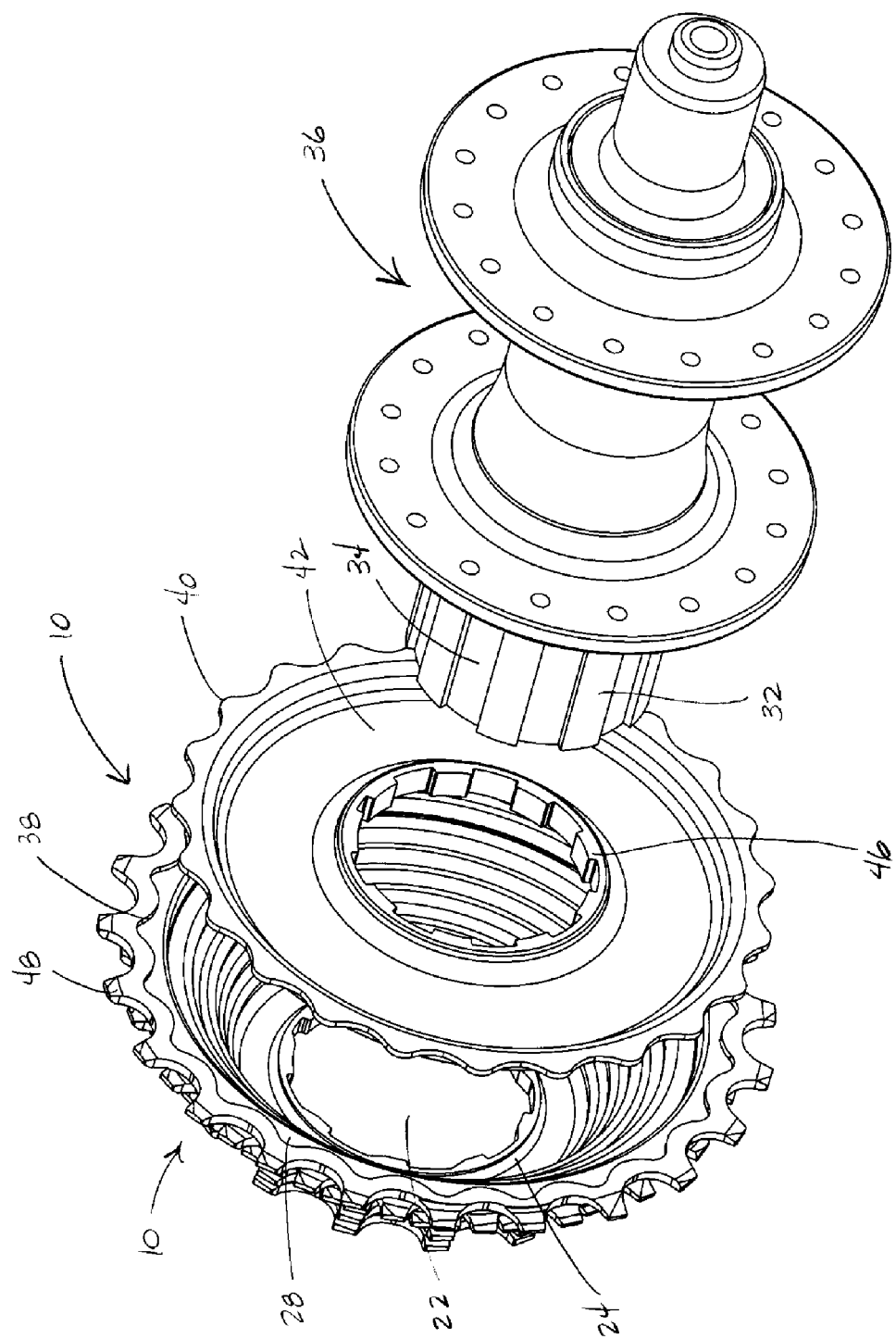
FIG. 3 is an exploded rear perspective view of the bicycle multi-gear cassette of FIG. 1 and a mating wheel hub.
Figure 4A:
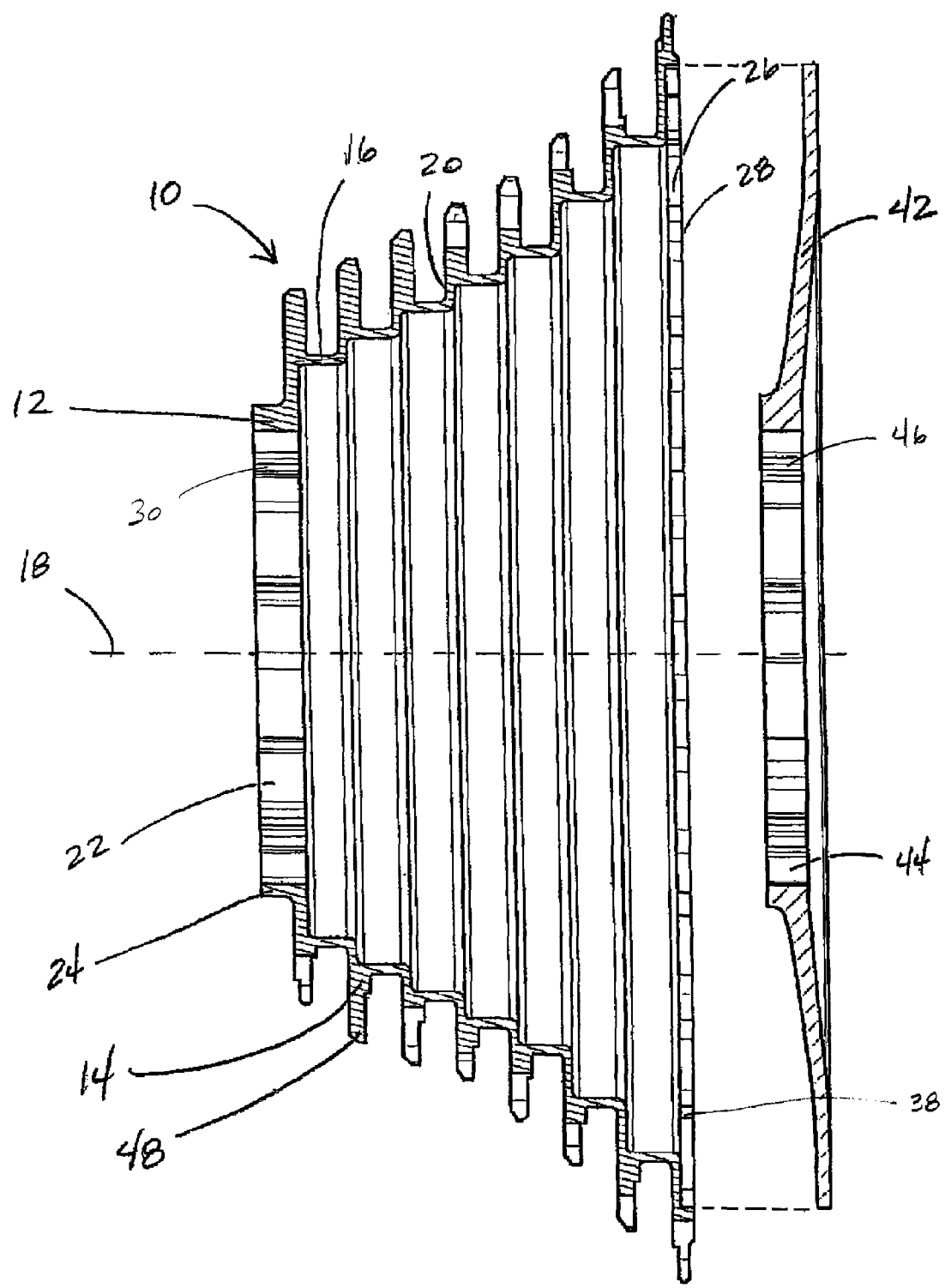
FIG. 4a is an exploded cross-sectional view of the bicycle multi-gear cassette of FIG. 1.
Figure 4B:
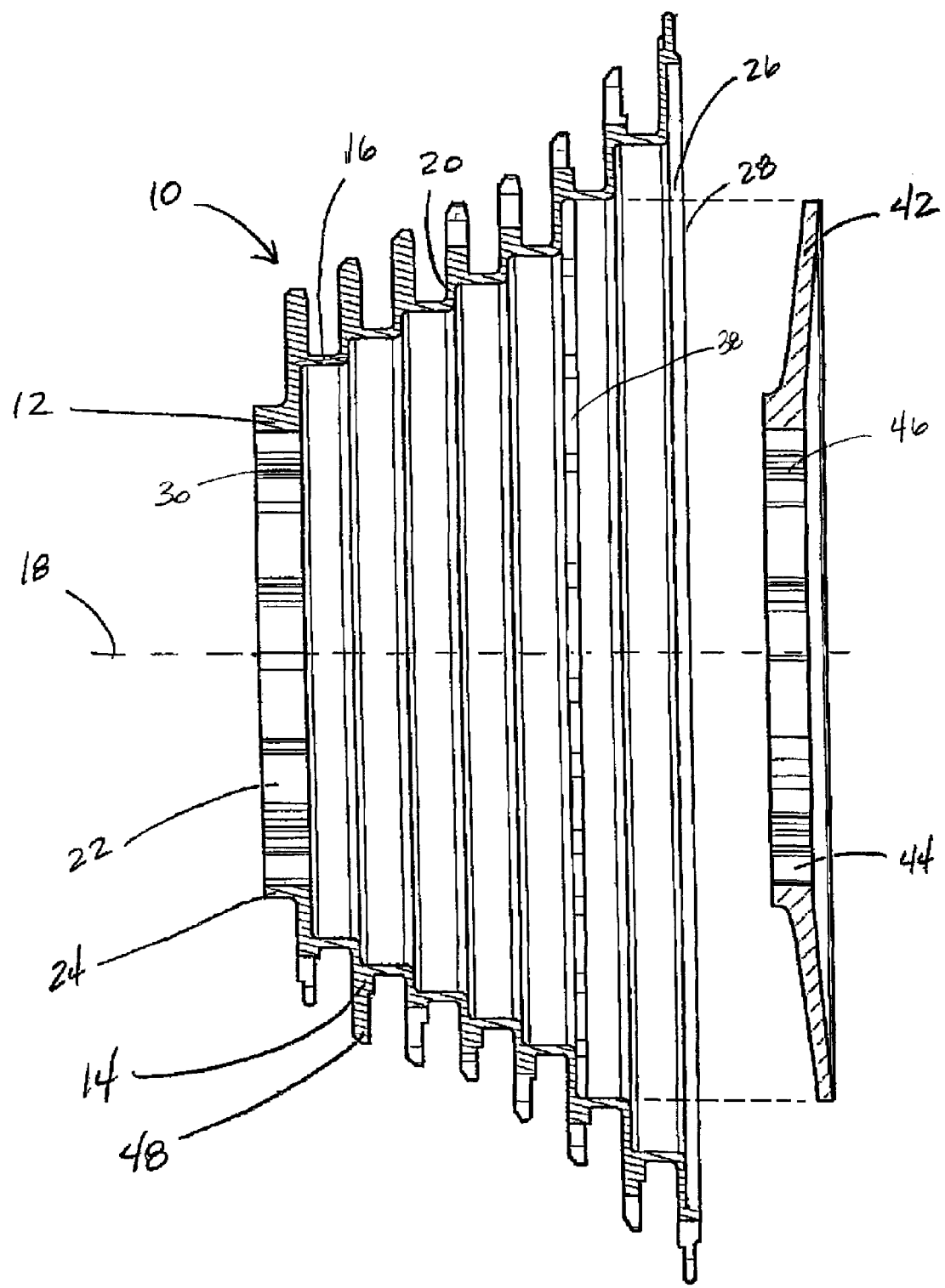
FIG. 4b is an exploded cross-sectional view of an additional embodiment of the invention including a cap member attachable to interior portion of the shell.
Figure 4C:
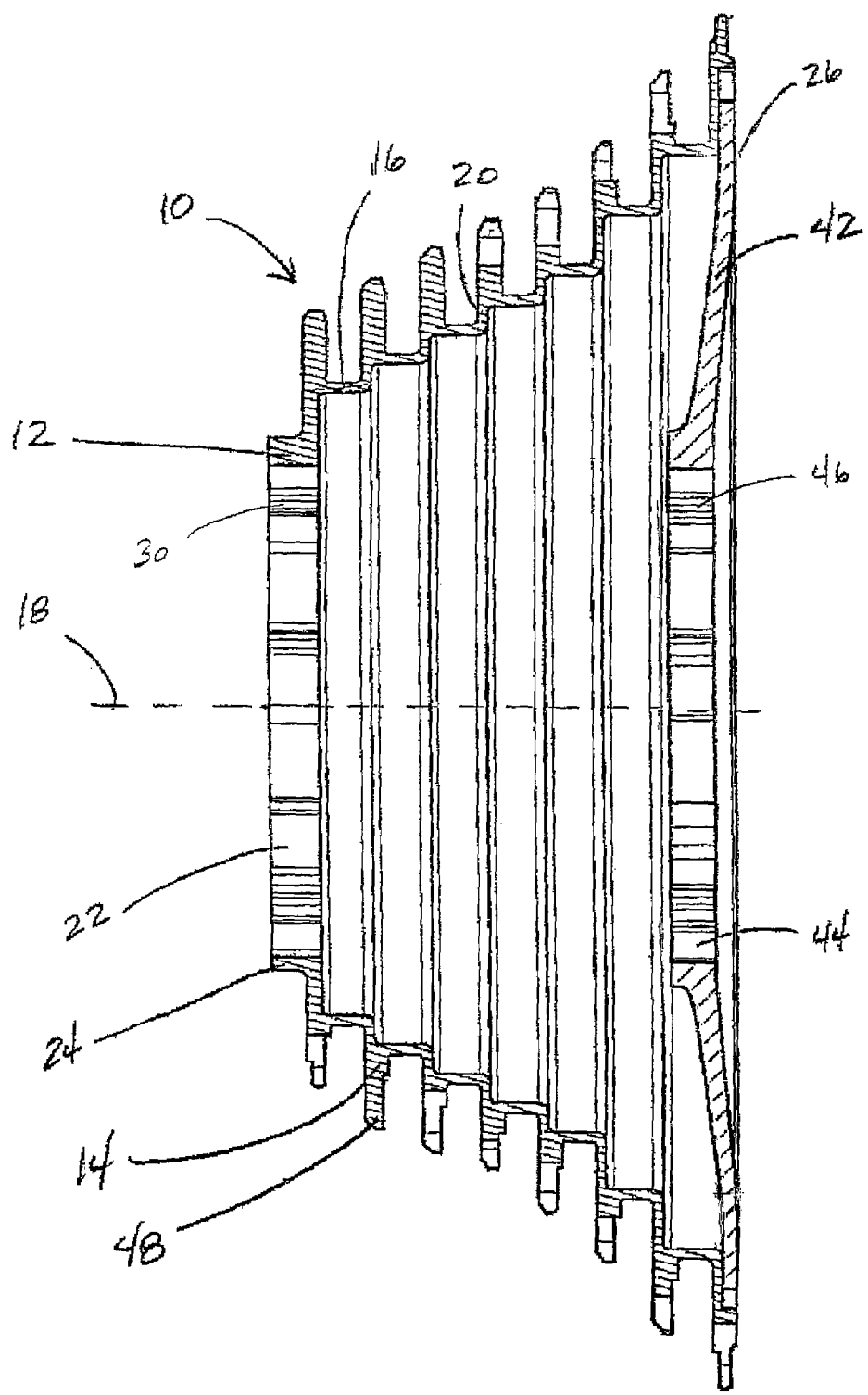
FIG. 4c is a cross-sectional view of an additional embodiment of a bicycle multi-gear cassette showing a shell, sprockets, loading transmitting profiles and a cap member embodying a single piece.

The shell 12 further includes a first opening 22 at a small shell base 24 and a second opening 26 at a large shell base 28. The first and second openings 22, 26 are coaxial with and substantially perpendicular to the shell axis 18. The shell 12 includes the torque and radial load transmitting profile 30 at the small shell base 24 on an inner surface of the shell 12 that engages a mating torque and radial transmitting profile 32, in this embodiment mating projections, disposed on an outer surface on a hub driver mechanism 34 of a wheel hub 36. The torque and radial load transmitting profile 38 is also located at the large shell base 28 on the inner surface of the shell that engages a mating load transmitting profile 40 on an outer surface of a removable cap member 42. The cap member 42 extends radially of the shell axis 18. In alternative embodiments, the cap member 42 may be coupled to a load transmitting profile disposed at an axially interior position of the shell 12 proximate the larger shell base 28 as shown in FIG. 4b. In alternative embodiments, torque and radial load transmitting profiles need not exist at both the large and small shell bases 24, 28, so long as at least one torque load transmitting profile and at least one radial load transmitting profile exist on the shell 12. In an alternative embodiment, the cap member 42, shell 12, sprockets 14 and load transmitting profiles 30, 38, 46 may embody a single piece as shown in FIG. 4c. The cap member 42 includes a third opening 44 for receiving the hub driver mechanism 34 therethrough. The cap member 42 further includes a torque and radial load transmitting profile 46 at the third opening 44 on an inner surface of the cap member 42 that engages the mating torque and radial transmitting profile 32 on the hub driver body 34. Looking to the torque and radial transmitting profile 46 of the cap member 42, radial surfaces 41 transmit radial load to the hub driver mechanism 34, and torque surfaces 43 transmit torque load to the hub driver mechanism 34. Torque and radial load transmitting profiles 30, 38 on the shell 12 have similar radial and torque surfaces. In an embodiment where only a radial load is being transmitted through the load transmitting profile, torque surfaces 43 are eliminated.

Figure 5:
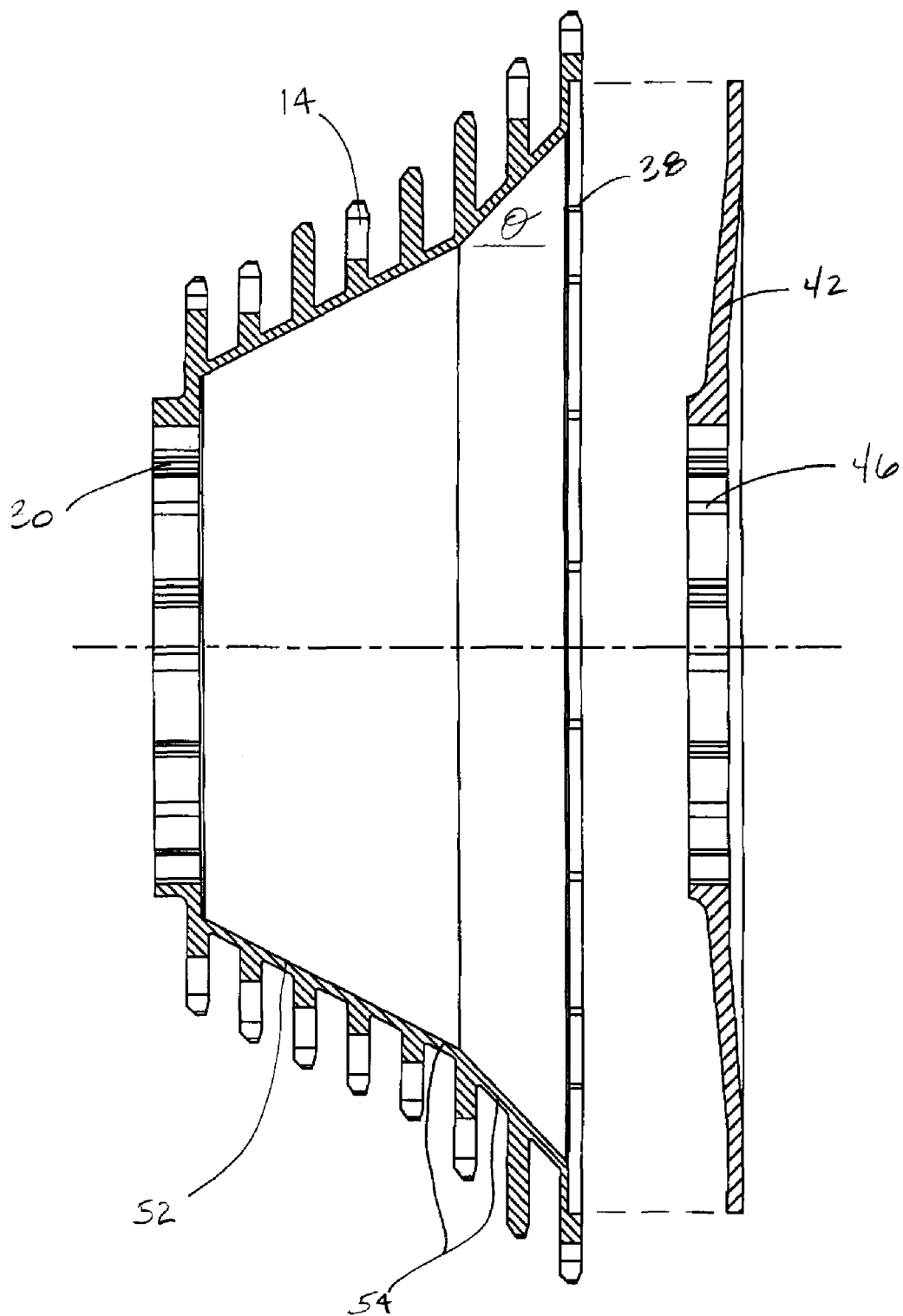
FIG. 5 is an exploded cross-sectional view of an additional embodiment of a bicycle multi-gear cassette having a tapered shell.
Figure 7:
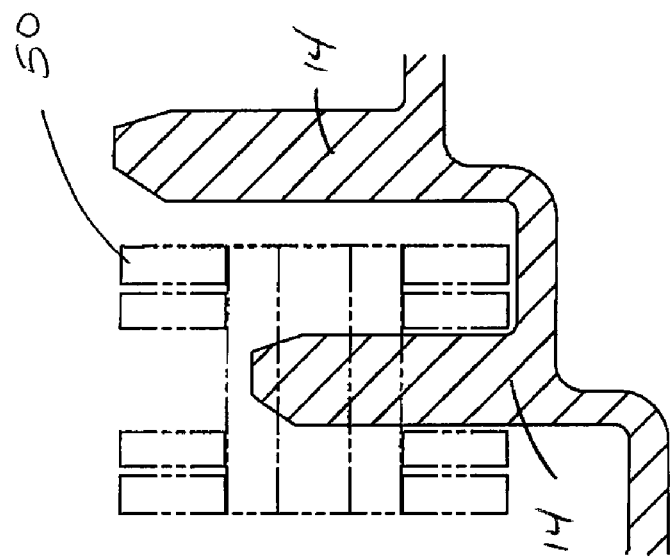
FIG. 7 is a detailed cross-sectional view of a bicycle chain engaging a sprocket tooth of the bicycle multi-gear cassette of FIG. 1.

In the embodiment of FIG. 5, a shell 52 includes a plurality of tapered cone segments 54 connecting the toothed sprockets 14 wherein the tapered cone segments 54, toothed sprockets 14 and load transmitting profiles 30, 38, 46 embody a single piece. In a preferred embodiment, the tapered cone segments 54 form an angle θ greater than 45 degrees to provide increased bending and buckling resistance to radially loading from the chain 50.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A bicycle multi-gear cassette mountable to a wheel hub, the cassette comprising:

a truncated conical shell having a first opening proximate a small shell base and a second opening proximate a lame shell base, the openings coaxial with a central axis of the shell, the first opening proximate the small shell base receiving the wheel hub;

a plurality of toothed sprockets having different numbers of teeth disposed on the shell and extending radially of the central axis;

a torque load transmitting profile configured on the shell proximate one of the small and lame shell bases;

a first radial load transmitting profile configured on the shell proximate the lame shell base transmitting radial load to the wheel hub;

a cap member extending radially of the shell axis and non-rotatably coupled to the radial load transmitting profile proximate the lame shell base, the cap member including a third opening coaxial with the shell axis and proximate the lame shell base, the third opening receiving the wheel hub;

a second radial load transmitting profile configured at the third opening transmitting radial load to the wheel hub; and a third radial load transmitting profile configured at the first opening and transmitting radial load to the wheel hub, wherein the shell, sprockets, and the first and third load transmitting profiles are a single-piece construction;

wherein the truncated conical shell comprises:

a plurality of coaxial annular cylinders of variable diameter extending along an axis;

a plurality of coaxial annular discs of variable diameter extending radially of the axis; and the cylinders and discs alternatingly arranged in a stepped sequence.

2. A bicycle multi-gear cassette according to claim 1, wherein the torque load transmitting profile is configured on one of the discs and cylinders, and the first radial load transmitting profile is configured on one of the discs and cylinders.

3. A bicycle multi-gear cassette according to claim 1, wherein one of the plurality of annular cylinders has a thickness smaller than a thickness of a base of an adjoining sprocket and one of the plurality of annular discs has a thickness smaller than the thickness of the base of the adjoining sprocket.

4. A bicycle multi-gear cassette mountable to a wheel hub, the cassette comprising:

a truncated conical shell having a first opening proximate a small shell base and a second opening proximate a lame shell base, the openings coaxial with a central axis of the shell, the first opening proximate the small shell base receiving the wheel hub;

a plurality of toothed sprockets having different numbers of teeth disposed on the shell and extending radially of the central axis;

a torque load transmitting profile configured on the shell proximate one of the small and lame shell bases;

a first radial load transmitting profile configured on the shell proximate the lame shell base transmitting radial load to the wheel hub;

a cap member extending radially of the shell axis and non-rotatably coupled to the radial load transmitting profile proximate the lame shell base, the cap member including a third opening coaxial with the shell axis and proximate the lame shell base, the third opening receiving the wheel hub;

a second radial load transmitting profile configured at the third opening transmitting radial load to the wheel hub; and a third radial load transmitting profile configured at the first opening and transmitting radial load to the wheel hub, wherein the shell, sprockets, and the first and third load transmitting profiles are a single-piece construction;

wherein the wheel hub includes a hub driver mechanism; and wherein the truncated conical shell comprises:

a plurality of coaxial annular cylinders of variable diameter extending along an axis;

a plurality of coaxial annular discs of variable diameter extending radially of the axis; and the cylinders and discs alternatingly arranged in a stepped sequence.

5. A bicycle multi-gear cassette according to claim 4, wherein the torque load transmitting profile is configured on one of the discs and cylinders, and the first radial load transmitting profile is configured on one of the discs and cylinders.

6. A bicycle multi-gear cassette according to claim 4, wherein one of the plurality of annular cylinders has a thickness smaller than a thickness of a base of an adjoining sprocket and one of the plurality of annular discs has a thickness smaller than the thickness of the base of the adjoining sprocket.

* * * * *